United States Patent
Ptak et al.

(10) Patent No.: US 9,957,769 B2
(45) Date of Patent: May 1, 2018

(54) ELEVATED TEMPERATURE RISER BEARING

(71) Applicant: LORD Corporation, Cary, NC (US)

(72) Inventors: Keith R. Ptak, Erie, PA (US); Frank J. Krakowski, Erie, PA (US); John P. Smid, Cypress, TX (US); W. Scott Redinger, Erie, PA (US)

(73) Assignee: LORD Corporation, Cary, NC (US)

( * ) Notice: Subject to any disclaimer, the term of this patent is extended or adjusted under 35 U.S.C. 154(b) by 0 days. days.

(21) Appl. No.: 14/784,200

(22) PCT Filed: Apr. 23, 2014

(86) PCT No.: PCT/US2014/035161
§ 371 (c)(1),
(2) Date: Oct. 13, 2015

(87) PCT Pub. No.: WO2014/176346
PCT Pub. Date: Oct. 30, 2014

(65) Prior Publication Data
US 2016/0053567 A1    Feb. 25, 2016

Related U.S. Application Data

(60) Provisional application No. 61/814,885, filed on Apr. 23, 2013.

(51) Int. Cl.
*E21B 33/038* (2006.01)
*E21B 17/01* (2006.01)
*F16L 27/103* (2006.01)
*F16L 55/02* (2006.01)
*F16L 57/00* (2006.01)
*F16L 39/00* (2006.01)
*E21B 19/00* (2006.01)
*E21B 17/08* (2006.01)

(52) U.S. Cl.
CPC ............ *E21B 33/038* (2013.01); *E21B 17/01* (2013.01); *E21B 17/085* (2013.01); *E21B 19/004* (2013.01); *F16L 27/103* (2013.01)

(58) Field of Classification Search
None
See application file for complete search history.

(56) References Cited

U.S. PATENT DOCUMENTS 4,068,868 A    1/1978  Ohrt
4,121,861 A   10/1978  Gorndt
(Continued)

FOREIGN PATENT DOCUMENTS

EP    2 525 125    11/2012
WO   2005/021925   3/2005

OTHER PUBLICATIONS

Neffgen, J.M., Advances in Flexible Pipe Design and Construction, Advances in Subsea Pipeline Engineering and Technology: Proceedings of Aspect '90, May 30-31, 1990, Aberdeen, UK, abstract (1 pg).

*Primary Examiner* — Matthew R Buck
*Assistant Examiner* — Douglas S Wood (57) ABSTRACT

This invention relates to an undersea riser bearing designed to operate at higher temperatures over an extended time frame while maintaining performance advantages of high capacity laminate (HCL) elastomeric composite bearings.

21 Claims, 8 Drawing Sheets

(56) References Cited

U.S. PATENT DOCUMENTS

| | | | |
|---|---|---|---|
| 4,183,556 A * | 1/1980 | Schwemmer | E21B 17/085 |
| | | | 285/223 |
| 4,416,473 A | 11/1983 | Lamy et al. | |
| 4,515,399 A | 5/1985 | Sullivan et al. | |
| 4,593,941 A | 6/1986 | Whightsil, Sr. | |
| 4,784,410 A | 11/1988 | Peppel et al. | |
| 5,195,754 A | 3/1993 | Dietle | |
| 5,354,104 A | 10/1994 | Senes et al. | |
| 5,568,983 A | 10/1996 | Wilson | |
| 6,409,428 B1 | 6/2002 | Moog | |
| 6,558,084 B2 | 5/2003 | Moog et al. | |
| 7,040,394 B2 | 5/2006 | Bailey et al. | |
| 7,090,006 B2 | 8/2006 | Salama | |
| 7,341,283 B2 | 3/2008 | Moses et al. | |
| 7,373,986 B2 * | 5/2008 | Pollack | E21B 43/0107 |
| | | | 166/345 |
| 7,871,110 B2 | 1/2011 | Ostergaard et al. | |
| 8,016,324 B2 | 9/2011 | Guiterrez-Lemini et al. | |
| 8,038,177 B2 | 10/2011 | Guiterrez-Lemini et al. | |
| 8,096,711 B2 | 1/2012 | Beauchamp et al. | |
| 8,128,129 B2 * | 3/2012 | Gutierrez-Lemini | F16L 27/103 |
| | | | 285/146.3 |
| 8,398,801 B2 | 3/2013 | Barlow et al. | |
| 8,888,142 B2 | 11/2014 | Janon et al. | |
| 8,919,447 B2 | 12/2014 | Thuet et al. | |
| 2009/0212557 A1 | 8/2009 | Gutierrez-Lemini et al. | |
| 2009/0212558 A1* | 8/2009 | Gutierrez-Lemini | E21B 17/085 |
| | | | 285/226 |
| 2011/0284153 A1 | 11/2011 | Barlow et al. | |
| 2012/0032434 A1 | 2/2012 | Guitierrez-Lemini et al. | |
| 2012/0241165 A1 | 9/2012 | Cupolillo et al. | |

* cited by examiner

ELEVATED TEMPERATURE RISER BEARING

CROSS-REFERENCE TO RELATED APPLICATIONS

The present application claims priority to U.S. Provisional Patent Application No. 61/814,885 filed on Apr. 23, 2013 by Keith R. Ptak, et al., entitled "ELEVATED TEMPERATURE RISER BEARING," which is incorporated by reference herein as if reproduced in its entirety.

BACKGROUND

Offshore hydrocarbon drilling systems may comprise a drilling riser that extends between a blow out preventer near a sea floor and a drilling rig. In some cases, the drilling riser may be perturbed relative to the blow out preventer by water currents, vortex induced vibrations, waves, and/or a variety of other perturbing forces acting on the drilling riser and/or the drilling rig to which the drilling riser is attached. Some riser bearings provide flexibility and/or relative movement between upper and lower portions of a fluid conduit under high temperatures and/or pressures. Some riser bearings are prone to premature wear and/or degradation as a function of riser bearing components being exposed to the relatively high heat conditions. Other riser bearing are prone to premature wear and/or degradation as a result of exposure to caustic drilling fluids and/or production fluids, which may be operating at elevated temperatures. Additionally, some riser bearings comprising high capacity laminate (HCL) elastomeric composite bearings may fail prematurely because of exposure to relatively high heat conditions.

SUMMARY

In many aspects, this invention provides for a riser bearing for elevated temperature operations. In one aspect, the invention provides a riser bearing capable of being positioned about a drill riser joint. The riser bearing comprises a pressure housing, a flange, a load carrying bearing, a first end plate, an intermediate plate, a sealing bearing, a second end plate and a sleeve. The pressure housing has a top and a bottom. The flange is secured to the top of the pressure housing. The flange has an inner surface oriented towards the bottom of the pressure housing. The load carrying bearing is a composite laminated bearing having a plurality of elastomeric members and non-extensible shims, wherein the elastomeric members and non-extensible shims are laminated together with an outer elastomeric member oriented towards and incorporated with the inner surface of the flange and an inner elastomeric member oppositely positioned from the outer elastomeric member. The first end plate has an inner surface and an outer surface, the outer surface oriented towards and incorporated with the inner elastomeric member of the load carrying bearing. The intermediate flange is proximate to and engaged with the inner surface of the first end plate. The sealing bearing is a composite laminated bearing having a plurality of elastomeric members and non-extensible shims, wherein the elastomeric members and non-extensible shims are laminated together with an outer elastomeric member oriented towards and incorporated with the inner surface of the intermediate flange and an inner elastomeric member oppositely positioned from the outer elastomeric member. The second end plate has an inner surface and an outer surface, the outer surface oriented towards and incorporated with the inner elastomeric member of the sealing bearing. The sleeve has an inner surface and an outer surface, the inner surface being positioned about the riser joint, wherein the sleeve has an upper ring and a lower ring. The sleeve is bonded to the upper and lower rings, wherein the outer surface of the sleeve is positioned proximate to at least the sealing bearing.

Numerous objects and advantages of the invention will become apparent as the following detailed description of the preferred embodiments is read in conjunction with the drawings, which illustrate such embodiments.

DETAILED DESCRIPTION

Figure 1:
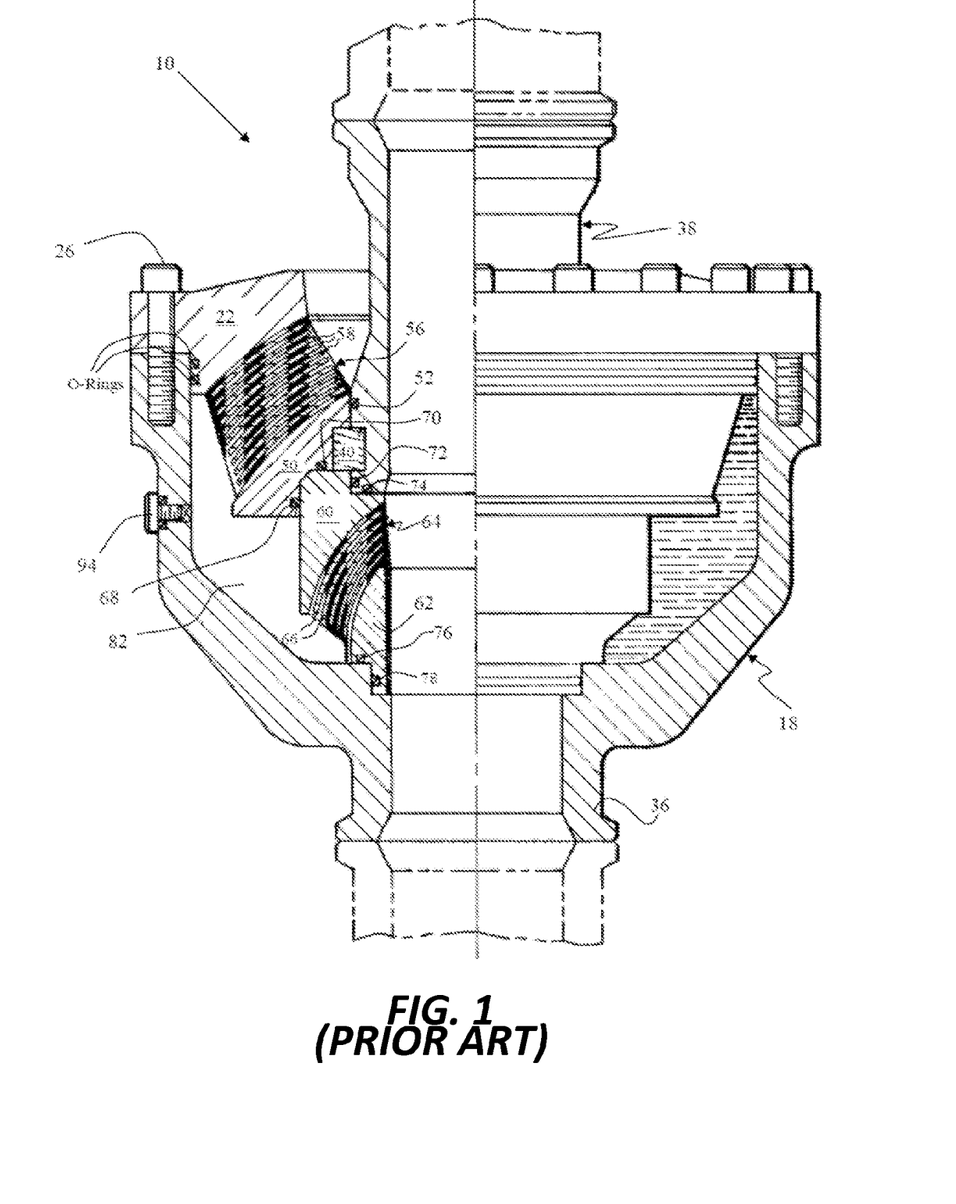
FIG. 1 illustrates a prior art riser bearing.

A prior art example of a riser bearing is the flexible pipe joint assembly 10 described in U.S. Pat. No. 4,183,556, of which the singular figure, col. 5, line 30—col. 7, line 16, col. 8, lines 32-38, and col. 10, lines 13-17 are hereby incorporated by reference and which is illustrated in Prior Art FIG. 1. Referring now to Prior Art FIG. 1, riser bearing 10 is shown with a load carrying bearing which incorporates elastomeric members 56 and nonextensible shims or laminations 58. The load carrying bearing is interposed between an upper flange member 22, or bearing housing, and an end plate 50. The load carrying bearing incorporates the flange 22 into the outer elastomeric member 56. Similarly, the load carrying bearing incorporates the end plate 50 into the inner elastomeric member 56. End plate 50 engages and is supported on annular flange 40 of tubular member 38, which is the upper pipe associated with the riser bearing. End plate 50 interfaces end plate 60. The sealing bearing, having elastomeric members 64 and non-extensible shims or laminations 66 is interposed between and bonded to the opposed spherical surfaces of the end plates 60 and 62. End plate 62 is adjacent to tubular extension 36, or lower pipe, and housing 18. Housing 18 is a pressure housing. Housing 18 incorporates tubular extension 36 geometry and flange. The sealing bearing has the same spherical center as the load carrying bearing. Threaded enclosure 94 provides access to cavity 82. Threaded enclosure 94 is used as the fill and bleed port for cavity 82. Cavity 82 is pressurized to a desired level. Annular o-rings 52, 68, 70, 72, 74, 76, 78 provide a secondary seal for riser bearing 10. The upper flange member 22 is secured to housing 18 with load bearing securing devices such as bolts 26.

Figure 2:
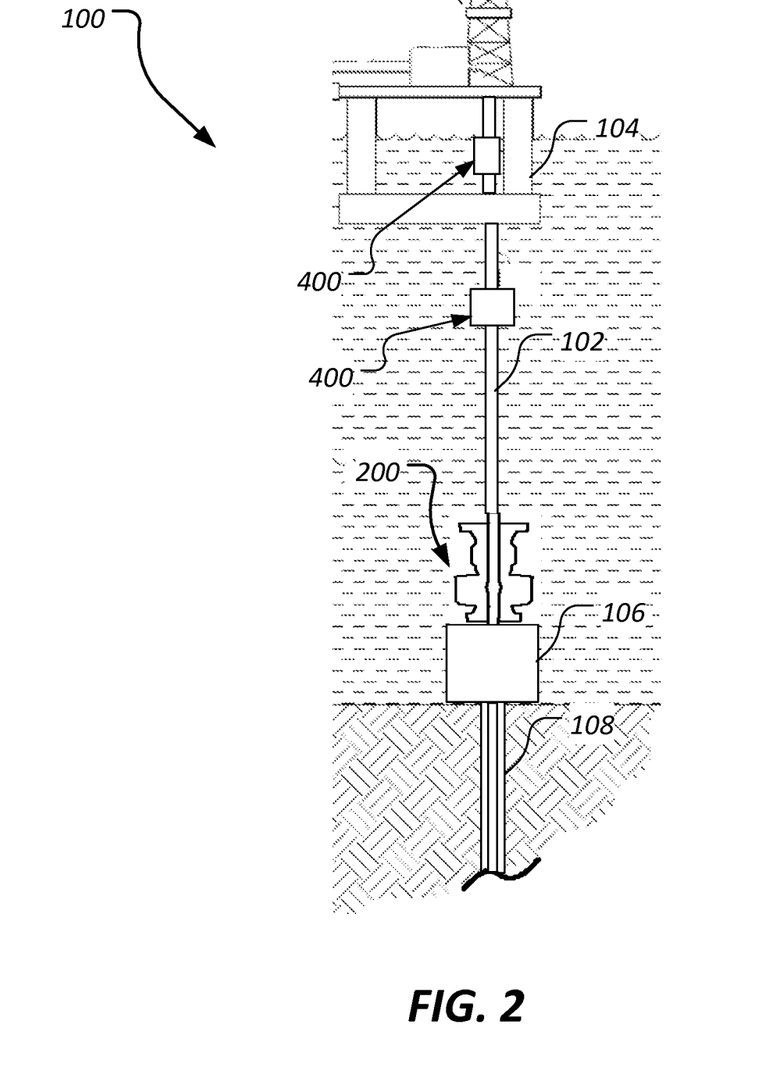
FIG. 2 is a schematic view of a hydrocarbon drilling system according to an embodiment of the disclosure.

Referring now to FIG. 2, an orthogonal side view of a hydrocarbon drilling system 100 according to an embodiment of the disclosure is shown. Most generally, the hydrocarbon drilling system 100 comprises a drilling riser 102 connected between a drilling rig 104 located near a surface of the water and a blow out preventer 106 located near a sea floor and/or associated with a well bore 108. In some embodiments, the drilling rig 104 may comprise a buoyant hydrocarbon drilling rig or platform, a freestanding hydrocarbon drilling rig, a ship, and/or any other structure that may be located and/or moved relative to the blow out preventer 106 in a manner that may cause variations in axial forces and/or variations in an amount of bending of the drilling riser 102. In some cases, the drilling riser 102 may carry drilling fluids and/or other working fluids at relatively high temperatures and/or pressures. The hydrocarbon drilling system 100 further comprises a riser bearing 200 configured to provide a long lasting and/or replaceable sealed movable joint between the drilling riser 102 and the fluid blow out preventer 106 even though the riser bearing 200 is exposed to high temperatures and/or pressures during repetitive perturbations and/or while accommodating axial loads and cocking offsets between the drilling riser 102 and the blow out preventer 106. The hydrocarbon drilling system 100 further comprises intermediate bearings 400. The intermediate bearings 400 are disposed along the length of the drilling riser 102 to join longitudinally adjacent portions of the drilling riser 102 while allowing the longitudinally adjacent portions of the drilling riser 102 to cock relative to each other.

Figure 3:
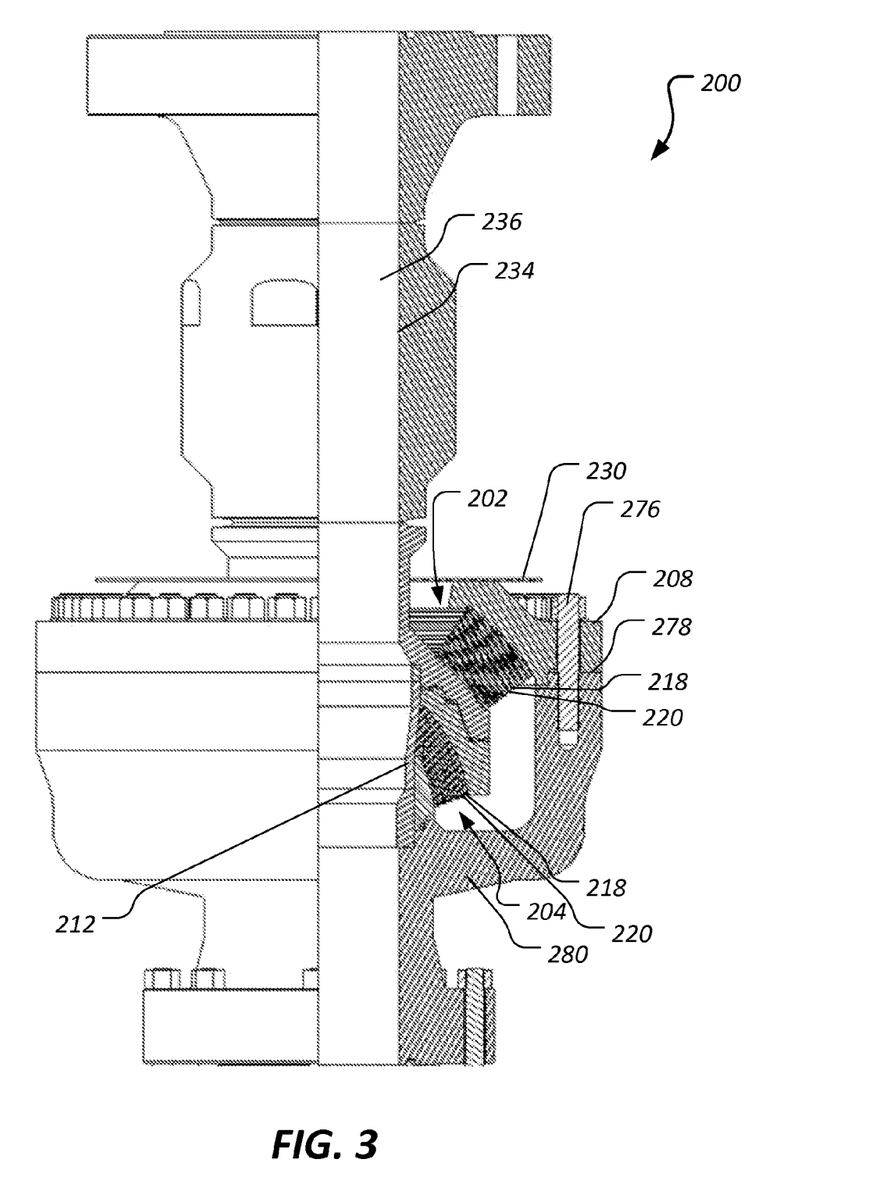
FIG. 3 is an orthogonal quarter cutaway side view of a riser bearing of the hydrocarbon drilling system of FIG. 2.
Figure 4:
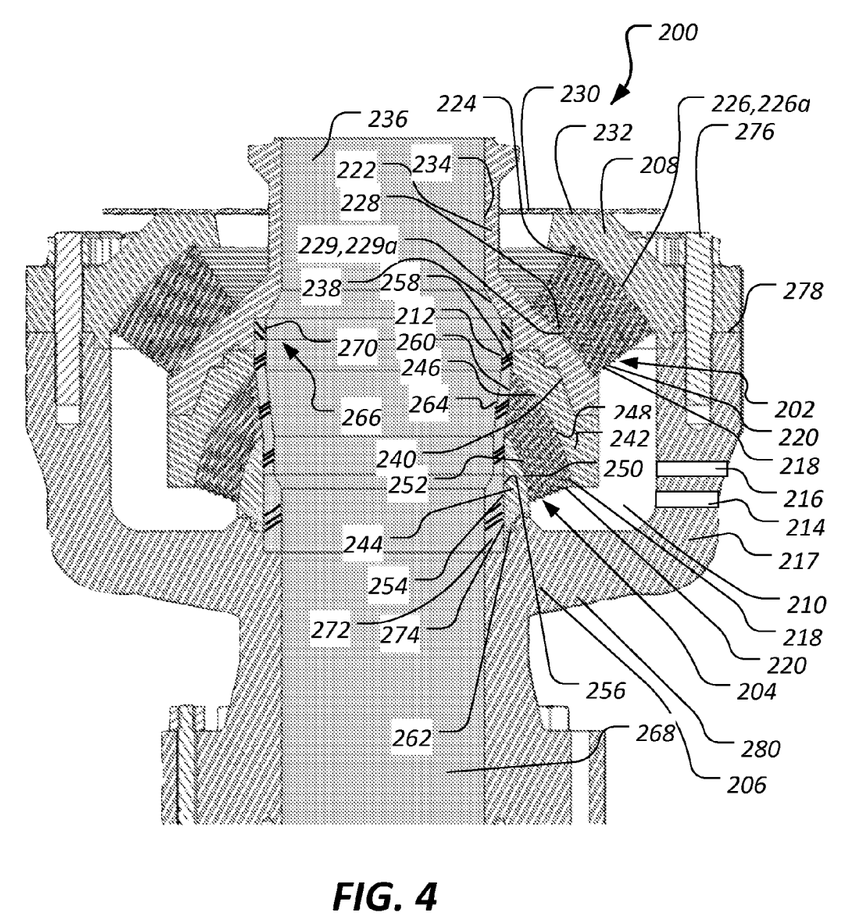
FIG. 4 is an orthogonal cross-sectional side view of the riser bearing of FIG. 3.

Referring now to FIGS. 3 and 4, an orthogonal quarter cutaway side view and an orthogonal cross-sectional side view of the riser bearing 200 are shown. Riser bearing 200 comprises a load carrying bearing 202 and sealing bearing 204, both of which are generally encapsulated in a space formed by a pressure housing 206 that is joined to a flange 208. The riser bearing further comprises a cavity 210, a sleeve 212, a fluid fill port 214 and a fluid bleed port 216. The fluid fill port 214 and fluid bleed port 216 are depicted in their positions in FIG. 4 for illustration purposes only and in alternative embodiments they may be located at any other suitable location for providing selective fluid connectivity between internal spaces of the riser bearing 200 and spaces external to the riser bearing 200. The cavity 210 is also contained within a space generally bounded by the pressure housing 206 and the flange 208, and the fluid fill port 214 and the fluid bleed port 216, in this embodiment, provide selective fluid communication through a wall 217 between a space outside the pressure housing 206 and the cavity 210. In addition to or instead of the riser bearing 200 comprising a fluid fill port 214 and/or a fluid bleed port 216, the riser bearing may comprise a volume compensator.

In this embodiment, the pressure housing 206 and the flange 208 are configured to contain and/or withstand internal pressures within up to about 6,000 pounds per square inch (about 41,370 kilopascals) to about 9,000 pounds per square inch (about 62,053 kilopascals). The pressure housing 206 and the flange 208 may be configured to meet or exceed ASME boiler and pressure vessel codes. While the pressure housing 206 comprises a bowl-like structure, in alternative embodiments, a pressure housing may comprise a cylindrical structure and a complementary lower flange, and/or any other suitable geometric configuration comprising any other suitable combination of complementary geometric shapes and/or profiles.

The cavity 210 comprises an open volume and/or space between the load carrying bearing 202 and the sealing bearing 204. The cavity 210 is configured to house a volume of pressurized fluid. Together, the cavity 210 and the associated pressurized fluid within the cavity 210 may allow motion clearance for the load carrying bearing 202, the sealing bearing 204, and associated metal components that may move as a function of movement at least one of the load carrying bearing 202 and the sealing bearing 204. The cavity 210 may also function as a fail-safe and secondary catch basin for any high pressure working fluid escaping through the seal bearing 204 in a case where the seal bearing 204 may be compromised.

In this embodiment, the load carrying bearing 202 comprises a high capacity laminate (HCL) bearing comprising alternatingly stacked and/or distributed elastomeric members 218 and, as compared to the elastomeric members 218, relatively non-extensible shims 220. In this embodiment, the elastomeric members 218 comprise nitrile. In alternative embodiments, the elastomeric members 218 may comprise any other suitable elastomeric material. In this embodiment, the non-extensible shims 220 comprise stainless steel. In alternative embodiments, the non-extensible shims 220 may comprise steel and/or any other suitable metal and/or sufficiently rigid material. The manufacture of HCL bearings is known to those having skill in the relevant art and is not discussed herein and it will be appreciated that this disclosure contemplates incorporation of any suitable HCL bearing in whole or in part to form either or both of the load carrying bearing 202 and the sealing bearing 204.

In this embodiment, the load carrying bearing 202 is interposed between flange 208 and a first end plate 222. The load carrying bearing 202 incorporates an inner surface 224 into an outer elastomeric member 226. To incorporate the inner surface 224, load carrying bearing 202 is bonded with the outer elastomeric member 226. The load carrying bearing 202 also incorporates an outer surface 228 of the first end plate 222 into the inner elastomeric member 229. To incorporate the outer surface 228, the load carrying bearing 202 is bonded with the inner elastomeric member 229. In some cases, the above-described bonding may be accomplished within a mold during a molding and/or bonding process that also joins the elastomeric members 218 to adjacent metal components.

Alternatively, the load carrying bearing 202 may be formed using a structural bonding process by which the load carrying bearing 202 is interposed between the flange 208 and the first end plate 222. In such cases, the load carrying bearing 202 may incorporate the inner surface 224 into an outer metal member 226a which may comprise steel and/or any other suitable metal. To incorporate the inner surface 224, the load carrying bearing 202 may be structurally bonded with the outer metal member 226a. Similarly, the load carrying bearing 202 may incorporate the outer surface 228 of first end plate 222 into an inner metal member 229a which may comprise steel and/or any other suitable metal. To incorporate the outer surface 228, the load carrying bearing 202 may be structurally bonded with the inner metal member 229a. The bonding referred to may comprise structural bonding with the adjacent metal components.

The riser bearing 200 further comprises a debris shield 230 that is freely and moveably positioned above an upper surface 232 of the flange 208. The debris shield 230 generally extends to and is proximate to a wall 234 of an upper riser portion such as fluid conduit upper portion 108. The debris shield 230 is configured to reduce and/or minimize debris collection on riser bearing 200, and in particular, to reduce exposure of an upward facing portion of the load carrying bearing 202 that may otherwise be at least partially open to the environment external to the riser bearing 200.

The first end plate 222 extends along the wall 234 and is proximate to a pipe flange 238. The first end plate 222 comprises an inner surface 240 proximate to and engaging an intermediate flange 242. The first end plate 222 is supported by the intermediate flange 242 and the first end plate 222 is adjacent to the sleeve 212.

The sealing bearing 204 comprises a high capacity laminate (HCL) bearing comprising alternatingly stacked and/or distributed elastomeric members 218 and, as compared to the elastomeric members 218, relatively non-extensible shims 220. In this embodiment, the elastomeric members 218 comprise nitrile. In alternative embodiments, the elastomeric members 218 may comprise any other suitable elastomeric material. In this embodiment, the non-extensible shims 220 comprise stainless steel. In alternative embodiments, the non-extensible shims 220 may comprise steel and/or any other suitable metal and/or sufficiently rigid material.

In this embodiment, the sealing bearing 204 is positioned below the load carrying bearing 202. In this embodiment, the sealing bearing 204 isolates and protects the load carrying bearing 202 by blocking the fluid that flows through the fluid conduit 102 from contacting the load carrying bearing 202 as well as by providing an insulative heat transfer obstruction between the load carrying bearing 202 and the fluid that flows through the fluid conduit 102. In cases where the fluid that flows through the fluid conduit 102 comprises a relatively high temperature, comprises abrasive particulate matter, comprises corrosive and/or chemically reactive materials, and/or is provided at relatively high pressures, the sealing bearing 204 may be considered a relatively sacrificial and/or safeguard barrier supplied for the benefit of prolonging a service life of the load carrying bearing 202 to the extent that the sleeve 212 may fail to provide such. In this embodiment, the sealing bearing 204 comprises a relatively higher shape factor as compared to the load carrying bearing 202 and the sealing bearing comprises a center of rotation, radius of curvature, and/or is otherwise geometrically configured and oriented so that the sealing bearing is suitable for withstanding and/or reacting without failure to the high working fluid pressures of the fluid carried by the fluid conduit 102 and/or through the central bore of the riser bearing 200. Accordingly, while the sealing bearing 204 is configured to allow the same cocking deflections as the load carrying bearing 202, the sealing bearing 204 transmits and/or carries a relatively lower axial and/or longitudinal load as compared to the load carrying bearing 202.

The sealing bearing 204 is interposed between an intermediate flange 242 and a second end plate 244. The sealing bearing 204 incorporates an inner surface 246 of the intermediate flange 242 into an outer elastomeric member 248 and the sealing bearing 204 incorporates an outer surface 250 of the second end plate 244 into an inner elastomeric member 252. To incorporate the inner surface 246, sealing bearing 204 may be bonded with the outer elastomeric member 248. Similarly, to incorporate the outer surface 250, the sealing bearing 204 may be bonded with the inner elastomeric member 252. In cases where the above-described bonding may be accomplished in a mold during a molding process, the sealing bearing 204 may comprise substantially the same center of rotation, radius of curvature, and/or spherical center as the load carrying bearing 202.

An inner surface 254 of the second end plate 244 is proximate to an outer surface 256 of the sleeve 212. Additionally, an upper end 258 of the intermediate flange 242 and an upper end 260 of the sealing bearing 204 are also proximate to the outer surface 256. A lower end 262 of the second end plate 244 is proximate to and supported by the pressure housing 206.

An inner surface 264 of the sleeve 212 is positioned about a riser joint 266, which may comprise a portion of the drilling riser 102. The sleeve 212 is positioned to separate sealing bearing 204 from riser joint 266 and the temperatures associated therewith. The sleeve 212 protects sealing bearing 204 and generally shields a remainder of the riser bearing 200 from the elevated temperatures, pressures, and/or working/drilling fluids associated with the riser joint 266, thereby increasing the longevity of the sealing bearing 204 and allowing the riser bearing 200 to operate in higher temperature environments, and in turn, thereby increasing the longevity of the load carrying bearing 202. In some embodiments, riser bearing 200 may be configured to operate for an extended service life even when exposed to temperatures ranging from about 37° F. (about 2° C.) to about 350° F. (about 177° C.). In other embodiments, riser bearing 200 may be configured to operate for an extended service life even when exposed to temperatures ranging from about 37° F. (about 2° C.) to about 450° F. (about 233° C.).

The sleeve 212 comprises an upper ring 270 and a lower ring 272. The upper ring 270 and the lower ring 272 are thermal insulators comprising annular and/or tube-like shapes comprising of a phenolic, PEEK, and/or elastomer coating configured to provide additional thermal insulative properties and capabilities. Upper ring 270 and lower ring 272 in alternate embodiments be made of other suitable materials such as steel, stainless steel or other metal alloys. As discussed above, the sleeve 212 is illustrated as being positioned about the riser joint 266 and along the central bore 274 of the riser bearing 200. The central bore 274 generally comprises the space generally bounded by the first end plate 222, the intermediate flange 242, the sealing bearing 204, the second end plate 244, and the pressure housing 206. In this embodiment, the sleeve 212 is bonded to both the upper ring 270 and the lower ring 272. In this embodiment, the upper ring 270 and the lower ring 272 are shown as being anchored into the riser bearing 200.

In this embodiment, the sleeve 212 comprises an elastomeric material bonded and capable of resisting temperatures up to about 350° F. (about 177° C.). In alternative embodiments, the sleeve 212 may comprise an elastomeric material that is bonded and capable of resisting temperatures up to about 450° F. (about 233° C.). Furthermore, the sleeve 212 is abrasion and erosion resistant. In some embodiments, the interior diameters of the sleeve 212 are at least large enough to accommodate a drill string therethrough without contacting the sleeve 212.

The load carrying bearing 202 may provide support for a critical load path within the riser bearing 200. Referring back to FIG. 2, the HCL portion of the load carrying bearing 202 may allow as much as ±20 degrees of cocking of the riser joint 268 between the drilling riser 102 and the blow out preventer 106 while retaining a required minimum axial load capacity. In some embodiments, about ±10° of cocking may be allowed by the riser bearing 200. In some embodiments, the required minimum axial load capacity is at least about 3,500,000 pounds force (about 15,569 kilonewtons) while in other embodiments the required minimum axial load capacity is at least about 4,000,000 pounds force (about 17,793 kilonewtons). In alternative embodiments, the riser bearing may be configured for any other selected axial load.

In some embodiments, the fluid fill port 214 and the fluid bleed port 216 may comprise check valves and be capable of withstanding about 10,000 pounds per square inch (about 68,950 kilopascals) pressure differential between the cavity 210 and the external environment. Additionally, the fluid fill port 214, fluid bleed port 216 and/or the optional check valves may provide for pressure equalization during a descent of the riser bearing 200 into increasingly deeper fluid environments.

In this embodiment, the flange 208 is secured to the pressure housing 206 with securing devices 276 in an angular array along a top 278 of the pressure housing 206. The securing devices 276 are collectively capable of withstanding a pressure differential between the cavity 210 and the environment external to riser bearing 200, as well as any external tensile load applied to the riser bearing 200 such that there is no gap between pressure housing 206 and the flange 208 when the riser bearing 200 is fully loaded and fully pressurized.

While FIGS. 2-4 show a bottom 280 of the pressure housing 206 integrally associated with additional mounting fixtures, alternative embodiments of a pressure housing may be associated with different and/or additional mounting fixtures without substantially altering the operation of the load carrying bearing, sealing bearing, and/or sleeve of the alternative embodiment as compared to the operation of those components of the riser bearing 200.

In operation of the riser bearing 200, the cavity 210 may be filled with a neutrally pressurized fluid for a specified working depth of the riser bearing 200. For example, if the riser bearing 200 is installed at an operating depth of 12,000 feet (about 3,658 meters), the cavity 210 may be filled with fluid and pressurized to about 5,200 pounds per square inch (about 35,860 kilopascals). By equalizing the pressure in cavity 110 to the environmental pressure at the installation depth, the ΔP across the load carrying bearing 202 will be 0 and/or substantially eliminated and the ΔP across the sealing bearing 204 is resultantly greatly reduced from the 5,200 pounds per square inch (about 35860 kilopascals) operating pressure. By reducing the pressure differential across each of the load carrying bearing 202 and the sealing bearing 204, the service life expectancy for both bearings may be increased. In this embodiment, the load carrying bearing 202 is sized and/or otherwise configured to withstand any sudden working pressure increase that may occur in the cavity 210, such as an unexpected pressure increase due to a failed and/or compromised seal bearing 204. It will further be appreciated that this disclosure contemplates additionally providing the riser bearing 200 with additional secondary seals known to those skilled in the art, such as o-rings and gaskets, that are capable of providing sealing in a compressive state and/or in an axial direction.

Figure 5:
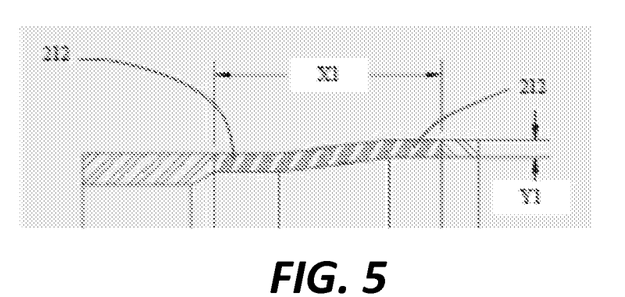
FIGS. 5 and 6 identify dimensions of a sleeve of the riser bearing of FIG. 3.
Figure 6:
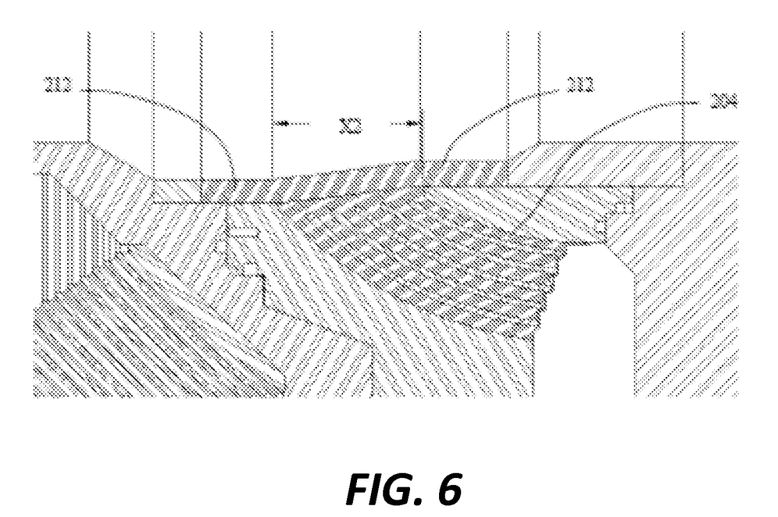

As illustrated in FIGS. 5 and 6, the sleeve 212 comprises a representative aspect ratio of between the respective lengths X1:X2 may be about 1:6 to about 1:12. The X1 length generally refers to the overall longitudinal length of the sleeve 212 while the X2 length generally refers to the longitudinal length of a central generally frustoconical middle portion of the sleeve 212 that joins a top cylindrical ring portion of the sleeve 212 to a bottom cylindrical ring portion of the sleeve. This range of aspect ratios for the sleeve 212 may reduce the strains experienced by the elastomeric material of the sleeve 212 as riser bearing 200 flexes and/or allows the above-described cocking motion. A sleeve 212 thickness, Y1, of the abrasion-resistant and erosion-resistant elastomer may provide and/or define a strength and/or durability of sleeve 212. The thickness of the elastomer of the sleeve 212 may also provide and/or define an effectiveness of the thermal insulative barrier characteristics of the sleeve 212. Accordingly, it will be appreciated that selection of suitable aspect ratios and thicknesses may directly contribute to achieving any desired increased service life for the seal bearing 204, and resultantly, any desired increased service life for the load carrying bearing 202.

Figure 7:
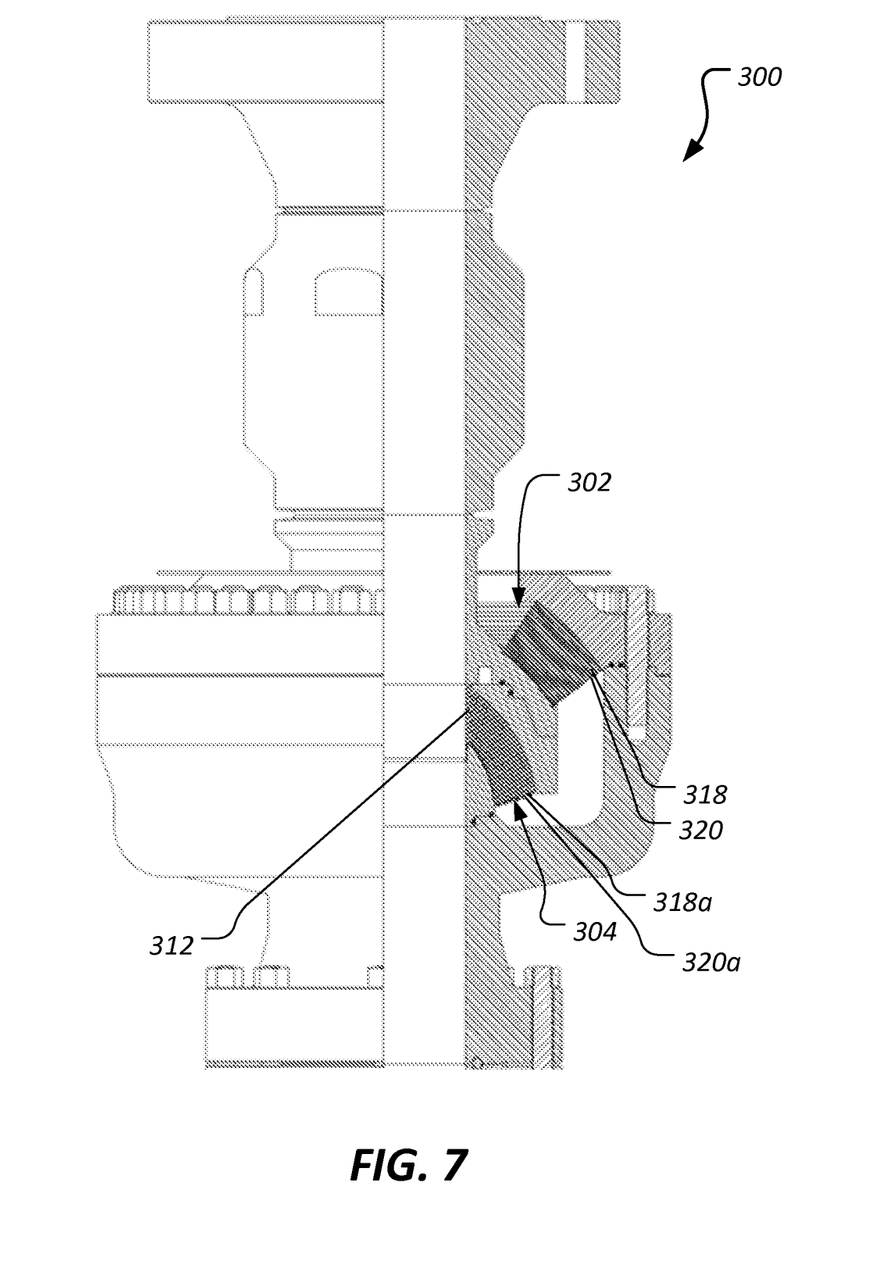
FIG. 7 is an orthogonal quarter cutaway side view of a riser bearing according to an alternative embodiment.

Referring now to FIG. 7, an alternative embodiment of a riser bearing 300 is shown. Riser bearing 300 is substantially similar to riser bearing 200 but for a primary difference being that the functionality of the sealing bearing 204 and the sleeve 212 are combined. In this embodiment, a sealing bearing 304 is configured with elastomeric members 318a, which comprise a different elastomeric composition as compared to elastomeric members 318 of the load carrying bearing 302. Further, non-extensible shims 320a of sealing bearing 318 may comprise a different metal as compared to non-extensible shims 320 of the load carrying bearing 302. The elastomeric members 318a comprise synthetic rubber such as nitrile and/or any other suitable elastomeric material or material combination. Non-extensible shims 320a comprise metal. Non-extensible shims 320 comprise steel and/or stainless steel. The elastomeric members 318a and the non-extensible shims 320a may provide a relatively higher resistance to heat transfer and/or heat degradation as compared to providing a separate sealing bearing and sleeve. In this embodiment, a thickened elastomeric portion 312 of the sealing bearing 304 serves the barrier function in a substantially similar manner to the sleeve 212. Further, in this embodiment, the integral nature of the sealing bearing functionality and the sleeve functionality may allow for a relatively more uniform central bore diameter through the riser bearing 300 as compared to the riser bearing 200. It will be appreciated that the riser bearing 300 and any other of the above-described riser bearing alternative embodiments may be utilized in place of the riser bearing 200 of the hydrocarbon drilling system 100.

Figure 8:
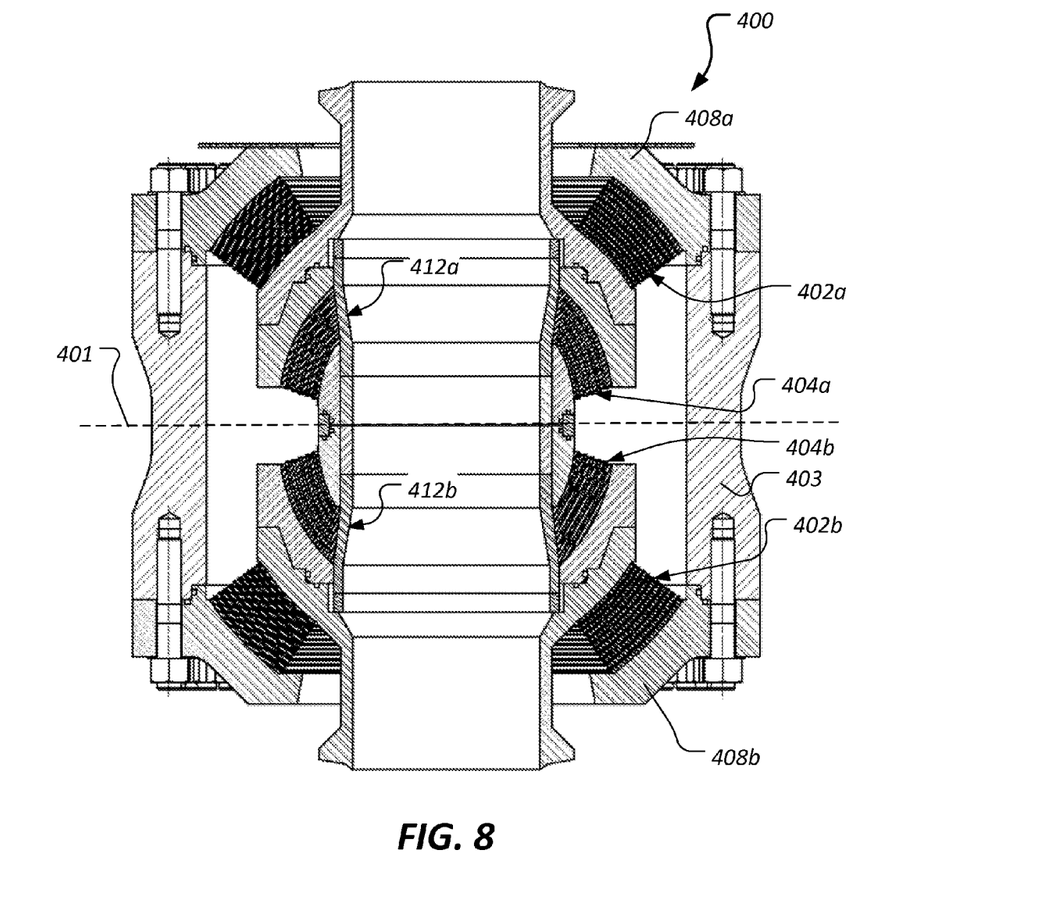
FIG. 8 is an orthogonal cross-sectional side view of an intermediate riser bearing of the hydrocarbon drilling system of FIG. 2.

Referring now to FIG. 8, an orthogonal cross-sectional side view of the intermediate riser bearing 400 is shown. The intermediate riser bearing 400 generally comprises components substantially similar to components of riser bearing 200, however, there are multiple load carrying bearings 402 and multiple sealing bearings 404. More specifically, the intermediate riser bearing 400 comprises an upper load carrying bearing 402a, a lower load carrying bearing 402b, an upper sealing bearing 404a, and a lower sealing bearing 404b. The intermediate riser bearing 400 further comprises multiple sleeves 412, namely, an upper sleeve 412a associated with the upper load carrying bearing 402a and the upper sealing bearing 404a. Similarly, the intermediate riser bearing 400 comprises a lower sleeve 412b associated with the lower load carrying bearing 402b and the lower sealing bearing 404b. As a group, the structure and operation of the upper load carrying bearing 402a, upper sealing bearing 404a, and upper sleeve 412a is substantially similar to the structure and operation of the group of the load carrying bearing 202, sealing bearing 204, and sleeve 212. Further, as a group, the structure and operation of the upper load carrying bearing 402b, upper sealing bearing 404b, and upper sleeve 412b is substantially similar to the structure and operation of the group of the load carrying bearing 202, sealing bearing 204, and sleeve 212. In this embodiment, the above-described upper components are substantially similar to the lower components but are oriented as a mirror image to each across a horizontal plane 401 represented in FIG. 8 as a dashed line that generally bisects the intermediate riser bearing.

Intermediate riser bearing 400 also differs from riser bearing 200 because it comprises a generally cylindrically shaped tubular connection ring 403 to which a flange 408a associated with the upper load carrying bearing 402a and a flange 408b associated with the lower load carrying bearing 402b each attached to capture the upper load carrying bearing 402a, the lower load carrying bearing 402b, the upper sealing bearing 404a, and the lower sealing bearing 404b within a space at least partially bounded by the connection ring 403. It will be appreciated that the intermediate riser bearing 400 may allow twice the amount of cocking offset as compared to a riser bearing 200 comprising substantially similar, but fewer, components. Accordingly, in some embodiments, the intermediate riser bearing 400 may provide up to about +/−40 degrees of cocking offset. In alternative embodiments, any other desired amount of allowed cocking offset may be provided by configuring the bearings differently.

Figure 9:
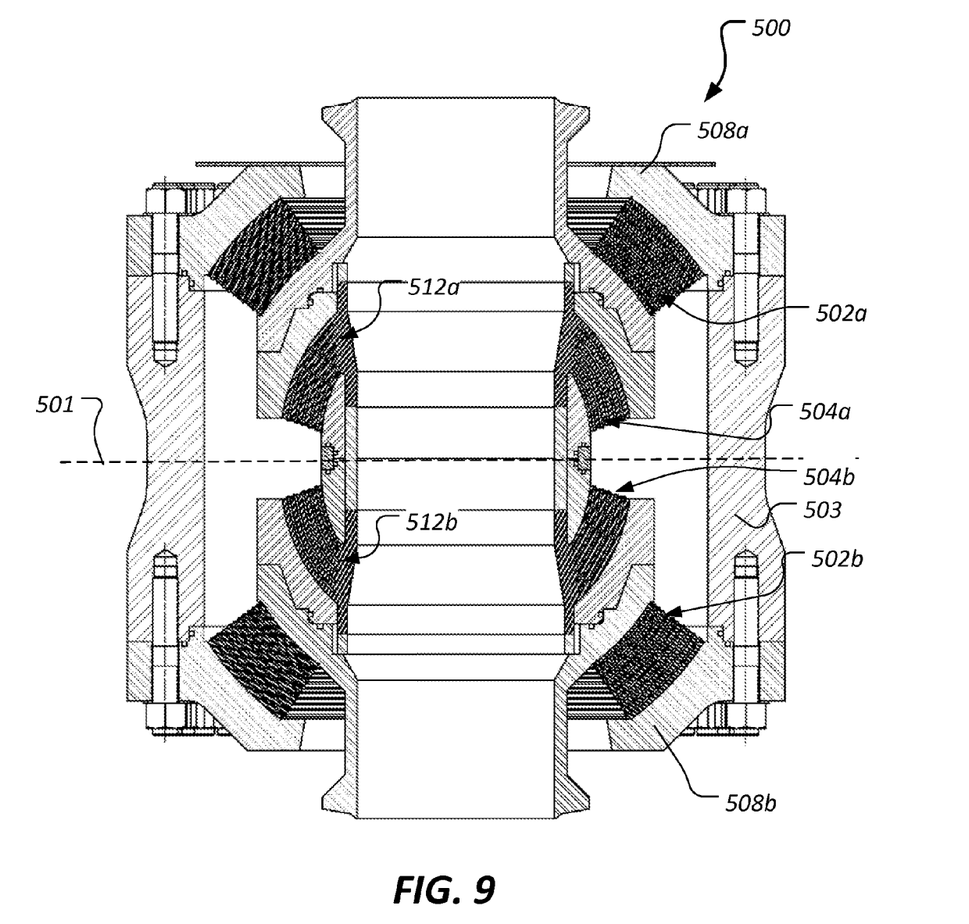
FIG. 9 is an orthogonal cross-sectional side view of an alternative embodiment of an intermediate riser bearing.

Referring now to FIG. 9, an alternative embodiment of an intermediate riser bearing 500 is shown. Intermediate riser bearing 500 is substantially similar to intermediate riser bearing 400 but for a primary difference being that the functionality of the sealing bearings 504a,504b and their respective sleeves 512a,512b are combined in a manner substantially similar to that described above with regard to the riser bearing 300. In this embodiment, thickened elastomeric portions 512a,512b of the sealing bearings 504a, 504b, respectively, serve the barrier function in a substantially similar manner to the sleeves 412a,412b. It will be appreciated that the intermediate riser bearing 500 and any other of the above-described intermediate riser bearing alternative embodiments may be utilized in place of the intermediate riser bearing 400 of the hydrocarbon drilling system 100.

It will further be appreciated that in alternative embodiments and/or when the hydrocarbon drilling system 100 is configured for production rather than drilling of hydrocarbons, the drilling string 102 may be replaced by a production riser that may comprise a relatively more dramatic curvature. Still further, it will be appreciated that any of the elastomeric bearing elements disclosed herein may be provided with a high performance coating, such as, but not limited to a protective flexible elastomeric coating configured to adhere to the elastomeric elements of the bearing to provide an additional manner to protect and lengthen a service life of the riser bearings.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A riser bearing (200), comprising:
    a pressure housing (206) having a top and a bottom;
    a riser joint (266);
    a flange (208) secured to the top (278) of the pressure housing (206), the flange (208) having an inner surface (224) oriented towards the bottom (280) of the pressure housing (206);
    a load carrying bearing (202), the load carrying bearing (202) being a composite laminated bearing having a plurality of elastomeric members (218) and non-extensible shims (220), wherein the elastomeric members (218) and non-extensible shims (220) are laminated together with an outer elastomeric member (226) oriented towards and incorporated with the inner surface (224) of the flange (208) and an inner elastomeric member (229) oppositely positioned from the outer elastomeric member (226);
    a first end plate (222) having an inner surface (240) and an outer surface (228), the outer surface (228) oriented towards and incorporated with the inner elastomeric member (229) of the load carrying bearing (202);
    an intermediate flange (242) proximate to and engaged with the inner surface (240) of the first end plate (222);
    a sealing bearing (204), the sealing bearing (204) being a composite laminated bearing having a plurality of elastomeric members (218) and non-extensible shims (220), wherein the elastomeric members (218) and non-extensible shims (220) are laminated together with an outer elastomeric member (248) oriented towards and incorporated with an inner surface (246) of the intermediate flange (242) and an inner elastomeric member (252) oppositely positioned from the outer elastomeric member (248);
    a second end plate (244) having an inner surface (254) and an outer surface (250), the outer surface (250) oriented towards and incorporated with the inner elastomeric member (252) of the sealing bearing (204);
    a sleeve (212) having an inner surface (264) and an outer surface (256), wherein the sleeve (212) has an upper ring (270) and a lower ring (272), the sleeve (212) bonded to the upper and lower rings (270, 272), wherein the sleeve (212) is positioned to separate the sealing bearing (204) from the riser joint (266), wherein the sleeve (212) position protects sealing bearing (204) from elevated temperatures, elevated pressures, and/or working/drilling fluids associated with the riser joint (266); and
    wherein the outer surface (256) of the sleeve (212) is positioned proximate to at least the sealing bearing (204).

2. The riser bearing (200) of claim 1, wherein the outer surface (256) of the sleeve (212) is positioned proximate to the inner surface (242) of first end plate (222), the inner surface (254) of second end plate (244), an upper end (258) of intermediate flange (242), and an upper end (260) of sealing bearing (204).

3. The riser bearing (200) of claim 1, a material of the elastomeric member (218) of the load carrying bearing (202) and a material of the elastomeric member (218) of the sealing bearing (204) are the same.

4. The riser bearing (200) of claim 1, a material of the elastomeric member (218) of the load carrying bearing (202) and a material of the elastomeric member (218) of the sealing bearing (204) are different.

5. The riser bearing (200) of claim 1, wherein a center of rotation of the load carrying bearing (202) is located substantially the same as a center of rotation of the sealing bearing (204).

6. The riser bearing (200) of claim 1, wherein a center of rotation of the load carrying bearing (202) is not substantially collocated with a center of rotation of the sealing bearing (204).

7. The riser bearing (200) of claim 1, wherein the sleeve (212) comprises a central substantially frustoconically shaped portion.

8. The riser bearing (200) of claim 1, wherein at least one of the upper ring (270) of the sleeve (212) and the lower ring (272) of the sleeve (212) comprise an elastomeric coated metal.

9. The riser bearing (200) of claim 1, wherein at least a portion of the sleeve (212) is formed integrally with the sealing bearing (204).

10. The riser bearing (200) of claim 1, wherein the sleeve (212) comprises a variation in internal diameter.

11. The riser bearing (200) of claim 1, wherein the sleeve (212) comprises a variation in external diameter.

12. The riser bearing (200) of claim 1, comprising a cavity configured to receive a pressurized fluid.

13. The riser bearing (200) of claim 1, comprising a pressurized fluid in a cavity (210) between the load carrying bearing (202) and the sealing bearing (204).

14. The riser bearing (200) of claim 1, wherein each of the load carrying bearing (202) and the sealing bearing (204) are configured to allow up to about +/−20 degrees of cocking motion.

15. The riser bearing (200) of claim 1, wherein the load carrying bearing (202) is configured to carry a greater axial load as compared to an axial load the sealing bearing (204) is configured to carry.

16. The riser bearing (200) of claim 1, wherein a shape factor of the sealing bearing (204) is greater than a shape factor of the load carrying bearing (202).

17. The riser bearing (200) of claim 1, wherein at least one of the upper ring (270) and the lower ring (272) are integrally formed with the sleeve (212) and comprise the same materials as the sleeve (212).

18. The riser bearing (200) of claim 1, wherein the sealing bearing (204) is configured to provide both a fluid barrier and a thermal barrier between a central bore (274) of the riser bearing (200) and the load carrying bearing (202).

19. The riser bearing (200) of claim 1, wherein the sleeve (212) is configured to provide both a fluid barrier and a thermal barrier between a central bore (274) of the riser bearing (200) and the seal bearing.

20. The riser bearing (200) of claim 1, wherein at least one of the elastomeric members (218) comprises nitrile.

21. A riser bearing (200), comprising:
a pressure housing (206) having a top and a bottom;
a flange (208) secured to the top (278) of the pressure housing (206), the flange (208) having an inner surface (224) oriented towards the bottom (280) of the pressure housing (206);
a load carrying bearing (202), the load carrying bearing (202) being a composite laminated bearing having a plurality of elastomeric members (218) and non-extensible shims (220), wherein the elastomeric members (218) and non-extensible shims (220) are laminated together with an outer elastomeric member (226) oriented towards and incorporated with the inner surface (224) of the flange (208) and an inner elastomeric member (229) oppositely positioned from the outer elastomeric member (226);
a first end plate (222) having an inner surface (240) and an outer surface (228), the outer surface (228) oriented towards and incorporated with the inner elastomeric member (229) of the load carrying bearing (202);
an intermediate flange (242) proximate to and engaged with the inner surface (240) of the first end plate (222);
a sealing bearing (204), the sealing bearing (204) being a composite laminated bearing having a plurality of elastomeric members (218) and non-extensible shims (220), wherein the elastomeric members (218) and non-extensible shims (220) are laminated together with an outer elastomeric member (248) oriented towards and incorporated with an inner surface (246) of the intermediate flange (242) and an inner elastomeric member (252) oppositely positioned from the outer elastomeric member (248);
a second end plate (244) having an inner surface (254) and an outer surface (250), the outer surface (250) oriented towards and incorporated with the inner elastomeric member (252) of the sealing bearing (204);
a sleeve (212) having an inner surface (264) and an outer surface (256), wherein the sleeve (212) has an upper ring (270) and a lower ring (272), the sleeve (212) bonded to the upper and lower rings (270, 272);
wherein the outer surface (256) of the sleeve (212) is positioned proximate to at least the sealing bearing (204);
wherein a shape factor of the sealing bearing (204) is greater than a shape factor of the load carrying bearing (202).

* * * * *